(No Model.)
D. H. GOOD.
SLING FOR HOLDING CORN SHOCKS, HAY, &c.
No. 503,043. Patented Aug. 8, 1893.
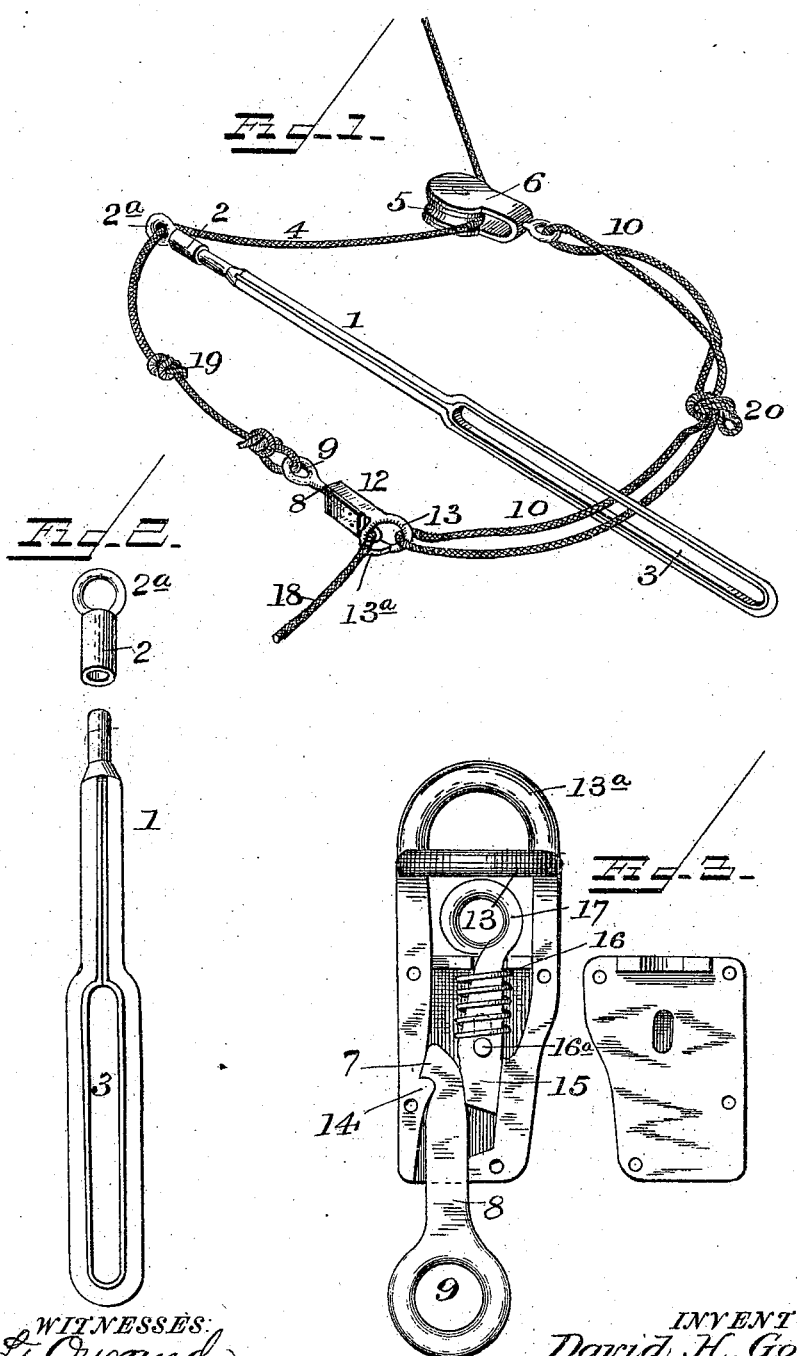
WITNESSES:
F. L. Ourand
[signature]
INVENTOR:
David H. Good,
by Lewis Dugger & Co
Attorneys

UNITED STATES PATENT OFFICE.

DAVID H. GOOD, OF CANADA, KANSAS.

SLING FOR HOLDING CORN-SHOCKS, HAY, &c.

SPECIFICATION forming part of Letters Patent No. 503,043, dated August 8, 1893.

Application filed March 27, 1893. Serial No. 467,754. (No model.)

*To all whom it may concern:*

Be it known that I, DAVID H. GOOD, a citizen of the United States, and a resident of Canada, in the county of Marion and State of Kansas, have invented certain new and useful Improvements in Slings for Holding Corn-Shocks, Hay, &c.; and I do hereby declare that the following is a full, clear, and exact description of the invention, which will enable others skilled in the art to which it appertains to make and use the same, reference being had to the accompanying drawings, which form a part of this specification.

My invention relates to improvements in slings for holding corn-shocks, hay, fodder, and other material while being elevated.

My present invention is designed more especially for use in connection with a machine for loading corn-shocks on a wagon or other vehicle, for which Letters-Patent of the United States were granted to me August 16, 1892, No. 480,767, although it may be used with equal advantage in other elevating or loading devices.

The object of the invention is to provide an improved sling for holding corn-shocks which shall possess superior advantages with respect to efficiency in operation.

The invention consists in the novel construction and combination of parts, hereinafter fully described and claimed.

In the accompanying drawings: Figure 1 is a perspective view of a sling constructed in accordance with my invention. Fig. 2 is a similar view of the shock-bar detached. Fig. 3 is a view of the device for connecting and disconnecting the ropes which bind or hold the shock or bundle.

In the said drawings the reference numeral 1 designates a bar preferably of metal, having a detachable thimble 2 at one end, provided with an eye $2^a$, and an elongated slot 3, at the other end. Passing through the eye 2, is a rope 4, which passes over a pulley 5 in a block 6, and leads to any suitable elevating or hoisting device. The other end of this rope is provided with a hook 7, having a shank 8, and an eye 9. The rope 4 is secured to the eye.

The numeral 10 denotes a rope secured to the block 6, and is passed through the slot in the bar 1. Its free end is provided with a rectangular box 12, having a loop 13, to which said rope is secured. One of the inner walls of this box, is formed with a lug 14, with which the hook 7 engages, and located within the box is a tapering movable pin 15, provided with a coiled spring 16, one end of which engages with studs $16^a$ on the pin, while the other end bears against the end wall of the box through which the pin passes. The pin is provided with an eye 17, to which is secured one end of a releasing rope 18, which passes over a loop $13^a$ formed on the box.

The operation is as follows: The thimble 2 is detached from the shock-bar and the end of the latter thrust through a shock of corn as it stands in the field. The thimble is then attached to the bar, and the ropes 4 and 10 are passed around the shock and connected together by the fastening device. By making this slot elongated, provides for binding and holding different sized shocks. The rope 4 intermediate of the eye in the shock-bar, and its free end, is knotted, as seen at 19, to prevent it from slipping too far in the said eye, and rope 10 is similarly knotted at 20, to limit the movement of the bar toward the block 6. It will be noted that when the hook 7 is inserted into the box 12, its end will strike the pin 15, and force it outwardly, until said hook engages with the lug 14, when the movement of the hook now being stopped, the coiled spring will cause the pin to press the hook against the lug, and thus securely unite the ropes 4 and 10. The studs $16^a$ not only serve to hold the coiled spring in place, but also prevent the pin 15 from turning. When the shock has been thus bound it is hoisted to a wagon, or other object, by means of rope 4, and when it has reached its destination, it can be readily unbound by pulling upon the rope 18, which disengages the hook 7 from the lug in the box 12. The operator can thus release the device from the shock without necessitating his climbing upon the wagon.

Having thus described my invention, what I claim is—

1. In a sling for corn-shocks, the combination with the bar having a detachable thimble provided with an eye at one end, and an elongated slot at the opposite end, of the block having a pulley, the rope passing around said pulley and through the eye in the said bar, the rope secured to said block and adapted to pass through the slot in said bar, and means for detachably connecting said ropes together, substantially as described.

2. In a sling for corn-shocks, the combination with the bar having an eye in one end and an elongated slot in the opposite end, of the block having a pulley, a rope passing around said pulley and through said eye, and provided with a hook at its free end, the rope secured to said block and adapted to pass through the slot in said bar, the box secured to the free end of said rope having a lug on its inner wall, the movable pin having a coiled spring, and the releasing rope, substantially as described.

In testimony that I claim the foregoing as my own I have hereunto affixed my signature in presence of two witnesses.

DAVID H. GOOD.

Witnesses:
 ISAAC GOOD,
 C. SCHLOTTERBECK.